United States Patent [19]

Schopp et al.

[11] 4,214,663
[45] Jul. 29, 1980

[54] TRANSFER APPARATUS FOR SELECTIVELY TRANSFERRING OBJECTS FROM A DELIVERY CONVEYOR TO SELECTED SECTIONS OF A RECEIVING CONVEYOR

[75] Inventors: Fredrick R. Schopp; Gordon A. Edmundson, both of Seattle, Wash.

[73] Assignee: Oscar Lucks Company, Seattle, Wash.

[21] Appl. No.: 814,427

[22] Filed: Jul. 11, 1977

[51] Int. Cl.² ............................................. B07C 5/04
[52] U.S. Cl. .................................... 209/552; 209/565; 209/922; 198/349; 198/358; 198/372; 198/456
[58] Field of Search .............. 209/72, 73, 74 R, 74 M, 209/82, 601, 659, 922, 552, 565, 566; 198/348, 349, 356, 358, 372, 456, 466

[56] References Cited

U.S. PATENT DOCUMENTS

| 2,609,947 | 9/1952 | Couchman et al. | 198/358 X |
|---|---|---|---|
| 3,140,771 | 7/1964 | Harrison et al. | 198/349 X |
| 3,471,012 | 10/1969 | Calhoun | 209/74 R |
| 3,955,678 | 5/1976 | Moyer | 209/74 M |
| 3,982,625 | 9/1976 | Wentz et al. | 198/577 X |

Primary Examiner—Joseph J. Rolla
Attorney, Agent, or Firm—David H. Deits; Roy E. Mattern, Jr.; Kenneth S. Kessler

[57] ABSTRACT

Objects on a delivery conveyor are detected by a photo-detector connected to a multi-bit shift register which is clocked by a pulse generator connected to the delivery conveyor. A NOR gate is connected between two outputs of the shift register and the shift register resets to erase information relating to undersized objects. Another circuit having NAND gates connected to a series of shift register outputs and to a counter connected to the pulse generator determines the presence of objects over a base size. A comparator connected to the counter provides a signal to a microprocessor, connected to the shift register resets, to erase information relating to an oversize object. Another section connected to the intermediate output of the shift register detects the location and length of gaps between adjacent objects. This section provides information to the microprocessor which through its connections to the shift register erases information relating to the leading object if the gap is too small. Signals leaving the shift register enter a second shift register and are monitored at variable output points by the micro-processor. A detector adjacent to a receiving conveyor detects sections to be loaded. A circuit connected to this detector and a pulse generator connected to the receiving conveyor generate signals fed into a multi-bit shift register also having outputs connected to the microprocessor. The microprocessor determines the alignment of an object and a receiving position and turns on an air jet to effect a transfer.

20 Claims, 9 Drawing Figures

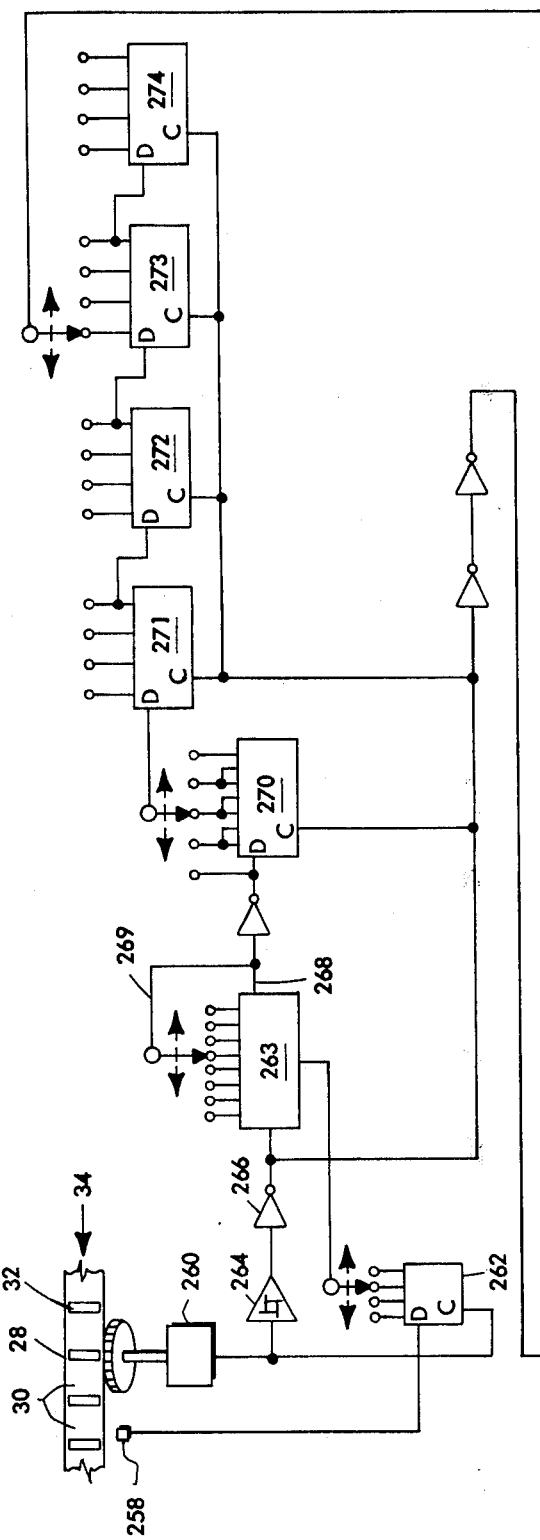
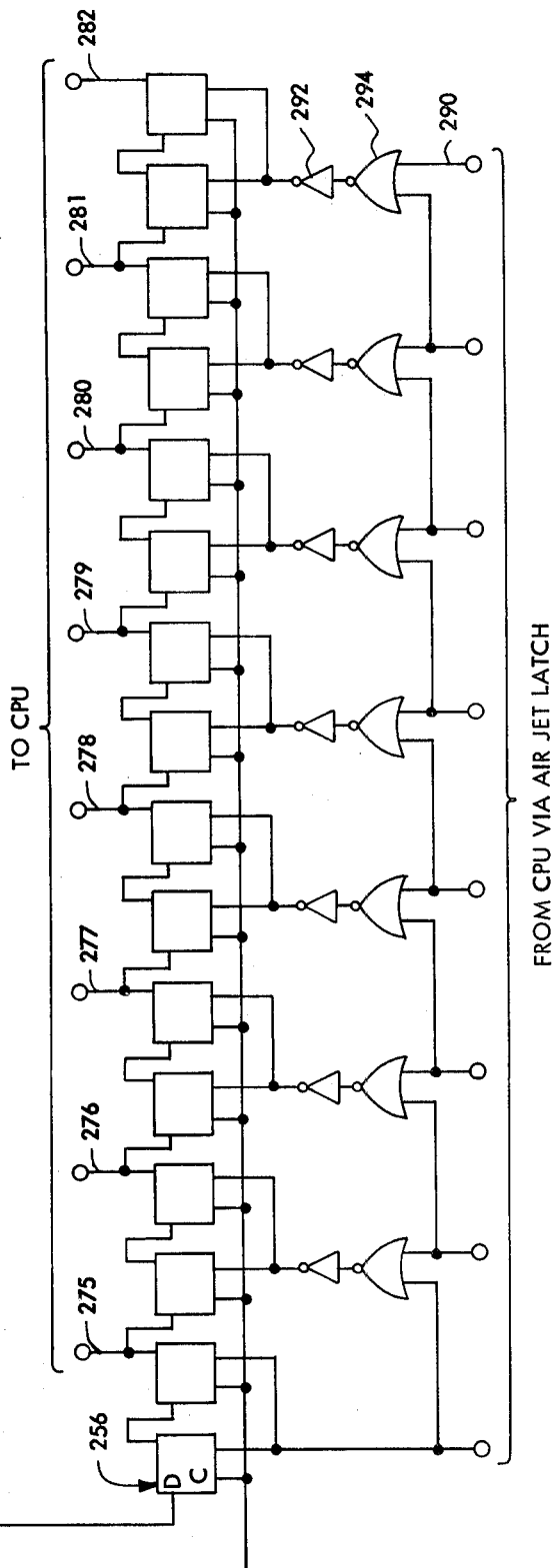

TRANSFER APPARATUS FOR SELECTIVELY TRANSFERRING OBJECTS FROM A DELIVERY CONVEYOR TO SELECTED SECTIONS OF A RECEIVING CONVEYOR

BACKGROUND OF THE INVENTION

1. Field of the Invention

The invention relates to the field of product handling. In particular the invention relates to an apparatus for transferring individual objects from a delivery conveyor to segments or pockets in a receiving conveyor. Although it is not so limited the device has found particular use in the transferring of food products, such as candy bars, which are deposited on a delivery conveyor at random fashion. Certain candy bar wrapping equipment must be fed bars at a perdetermined spacing determined by pockets on a wrapper feed conveyor. The invention is particularly suited to filling the pockets on the wrapper feed conveyor with individual bars and is able to discriminate between undersized bars, oversized bars, and properly sized bars and transfer only the properly sized bars.

2. Prior Art

Previously the transferring of candy bars to pockets on a wrapper feed conveyor was done manually.

Several U.S. patents illustrate some of the prior devices for transferring objects from a delivery conveyor. The Jenney et al U.S. Pat. No. 2,841,269, illustrates an apparatus for sequentially transferring biscuits which interrupt a series of photocells to trigger a series of corresponding air jets to sequentially remove the biscuits from a feed conveyor and place them in a series of adjacent slots leading to transverse conveyors. The Calhoun U.S. Pat. No. 3,471,012, illustrates a device for effecting a lateral transfer to a second conveyor by extending and retracting slats on a third, parallel conveyor. The Anderson U.S. Pat. No. 3,096,871, illustrates a controlled lateral transfer between parallel conveyors of objects by the interruption of photocells which through a control circuit operates a transfer mechanism. The control circuit determines when to activate the transfer mechanism by determining when the center of the object meets the center of the transfer mechanism. The Molins U.S. Pat. No. 3,437,189, illustrates an apparatus for handling rod shaped articles such as cigarettes and transferring them in multiple unit transfers.

SUMMARY OF THE INVENTION

A transfer apparatus for selectively transferring objects such as food products like candy bars from a delivery conveyor to selected sections or pockets of a receiving conveyor by one or more transfer devices such as air jets is provided. The apparatus may be provided with decisional abilities enabling it to avoid transferring objects which are of an improper size and which are too closely spaced to other objects to be transferred effectively by the transfer devices. The device, in its preferred form, consists of an object detection system which includes a detector for determining the passage of an object on the delivery conveyor, such as a photocell, and a device such as a belt pulse generator which detects movement of the delivery conveyor. The output of the photocell is fed into a first shift register having variable output connections to provide an initial delay adjustment capability. The clock input of the shift register is connected to the delivery conveyor pulse generator. The output of the shift register is fed into a multi-bit shift register within which the size and spacing of the objects are analyzed. The clock terminal of the shift register is likewise connected to the delivery conveyor pulse generator. Signals within this shift register represent the size and position of the objects on the delivery conveyor. A NOR gate is connected to two of the outputs of the shift register and to reset connections on the shift register to erase signals representing undersize objects. The inputs of two NAND gates are connected to a series of adjacent outputs of the shift register to provide an output signals which are fed through a NOR gate and amplifier into a counter. The counter is connected to the delivery conveyor pulse generator so that the counter output total represents a dimension by which an object exceeds a base value. A comparator having a variable setting provides an output when the base limit is exceeded by an amount representing a maximum object size desired. The output of the comparator is fed to a microprocessor which is connected to the shift register to erase signals corresponding to an oversize bar. Another circuit consisting of a NAND gate, three amplifiers, and a flip-flop is connected to three outputs of the shift register. This circuit determines the location of the rear end of an object passing through the system and determines whether a following object is within a certain distance. If the spacing is too close an output is provided to the microprocessor which through its connections to the shift register searches out and erases any information in the shift register relating to the leading object. Two ultimate outputs are provided from this shift register. The first is connected to a flip-flop to generate pulse representing the leading edge of an object. This pulse is fed into a leading edge shift register having intermediate outputs representing the position of air jets along the conveyor. The second output enters a similar but separate shift register and receives signals representing the full length of the object. The outputs into these latter two shift registers represent objects which are suitable for being transferred to the receiving conveyor. A device such as a proximity switch detects the sections on the receiving conveyor which are to be filled. The output of the proximity switch is fed into a shift register having an adjustable output connection to provide a delay adjustment. The shift register has its clock connected to a pulse generator which is connected to and detects movement of the receiving conveyor. The delayed signal from the proximity switch triggers a pulse generator which provides a window pulse of a variable length representing the size of a pocket within the section of the conveyor to be filled. This pulse in turn is fed into a series of shift registers which are also connected to the receiving conveyor pulse generator and which have variable output connections to provide an ability to adjust the position of the window and therefore the position of the pocket within the conveyor section. The output information is fed then to a shift register similar to that for the processed signals above having outputs corresponding to the position of the air jets. The microprocessor monitors the outputs of the three shift registers to determine when an object is in a position to be transferred by a particular air jet into one of the receiving positions on the receiving conveyor. Upon finding the desired relationship the microprocessor actuates an air jet to effect the transfer and erases the signals from the shift register representing the filled pockets and the object transferred so that a downstream jet will not turn to try to move an object that has already been transferred. A signal from the full length object shift register turns off the air jet so as not to affect other objects on the conveyor.

In other embodiments any one or all of the oversized, undersized, or gap detection circuits may be omitted from the transfer system.

DESCRIPTION OF THE DRAWINGS

FIG. 4 is a schematic diagram of a portion of the transfer apparatus illustrating the receiving conveyor and the inputs to the pocket shift register.

DETAILED DESCRIPTION OF THE INVENTION

INTRODUCTION

In the course of handling many products it often becomes necessary or desirable to transfer objects on a delivery conveyor to an adjacent conveyor. Often only specific sections of the receiving conveyor are to be filled with the transferred objects. The sections, or pockets, on the receiving conveyor may be uniformly spaced, as well as, be of a uniform or nonuniform size. An apparatus is provided to effect the transfer of objects from the delivery conveyor, whether randomly or uniformly spaced, to pockets on a receiving conveyor which may themselves be uniformly or randomly spaced. The transfer may be conditioned on the object meeting selected size criteria as well as having a satisfactory position relative to other objects on the delivery conveyor.

A TYPICAL APPLICATION

Such a transfer apparatus has been found to be particularly useful in the handling of candy bars. For the purposes of illustration this description will refer to an apparatus which has been put to such a use. The apparatus could be used, though, to transfer other objects in a similar fashion.

A PREFERRED EMBODIMENT

THE CONVEYORS AND TRANSFER MECHANISM

Figure 6:
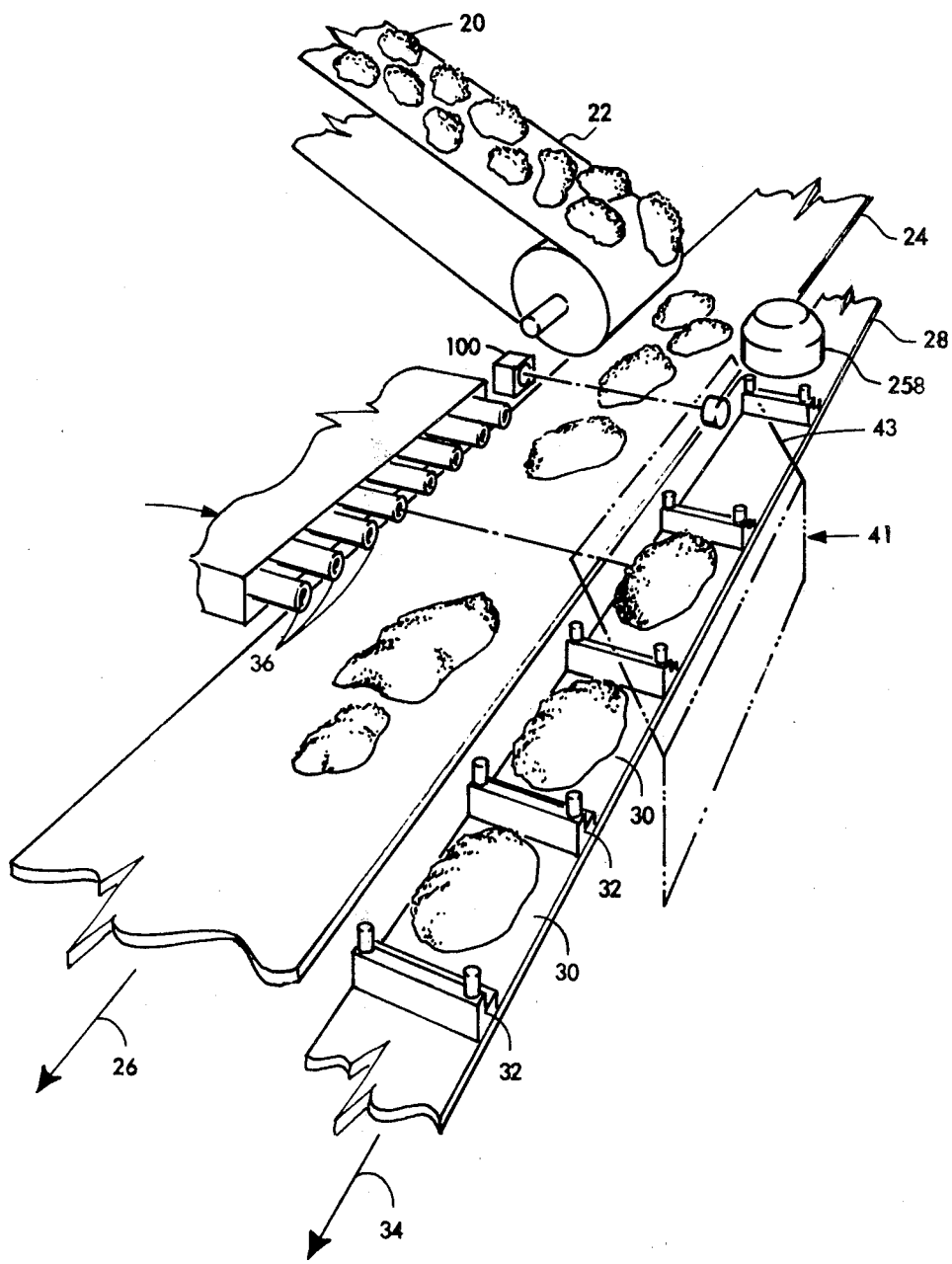
FIG. 6 is a perspective view of the conveyors, air jets, bars, sensors, and the backstop panel illustrating the transfer of the bars.

Referring to FIG. 6, the candy bars 20 are transferred from a bulk product conveyor 22 onto a delivery conveyor 24 traveling in the direction of the arrow 26. The spacing of the bars 20 is random. Preferably the delivery conveyor 24 is moving faster than the bulk product conveyor 22 so that some spacing of the product is achieved. An adjacent conveyor 28 for receiving the bars 20 has receiving sections, or pockets 30 defined by separating pusher bars 32. The receiving conveyor, traveling in the direction of the arrow 34 delivers the bars, with no more than one per section 30, to a wrapping machine, not shown.

The bars 20 are transferred from the delivery conveyors 24 to the receiving conveyor 28, by transfer devices such as the eight air jets 36 illustrated in FIG. 6. They are sequentially spaced along the delivery conveyor to direct a stream of air 38 across the conveyor to blow the bars into the pockets 30 when a bar is opposite a jet and an empty pocket. The air jets 36 contain a control valve 40 which permits selective actuation of an individual air jet. In an actual operation of the preferred embodiment, where the bars 20 were an average of 2¼" in length and the pockets ranged generally from 4 to 8" in length, an air jet spacing of approximately 2" was used and found satisfactory.

Where an air jet transfer device is used it may be necessary to provide a backstop panel 41 as shown in FIG. 6 in phantom. The backstop prevents the bars from overshooting the receiving conveyor and preferably has a downtilted portion 43 to deflect the bars down into the pockets of the receiving conveyor. The pockets of the conveyor may be shaped with an integral bumper or the conveyor may be of a width such that the use of a backstop may be unnecessary.

An air jet transfer is used in the illustration because it was found to be very flexible and well suited to high speed use with the relatively fragile candy bars. other transfer devices may be used, for example, pushers or trap doors.

In the actual and illustrative example eight transfer devices were used. In the operative example the delivery conveyor 24 delivered bars at a variable rate up to 400 bars per minute and the receiving conveyor could feed up to 200 bars per minute to the wrapper. Typically only the first two, or upstream air jets 36 operated on a regular basis. The alignment required usually occurred before the bars passed the second air jet. The apparatus may be used with one or more transfer devices and is not limited to use with eight transfer devices.

In the operative example two transfer systems leading to wrapping machines were operated receiving the bars from the same delivery conveyor. The undesirably spaced or sized bars which were not transferred passed on to a bulk packaging operation.

THE CONTROL SYSTEM

AN OVERVIEW

Figure 5:
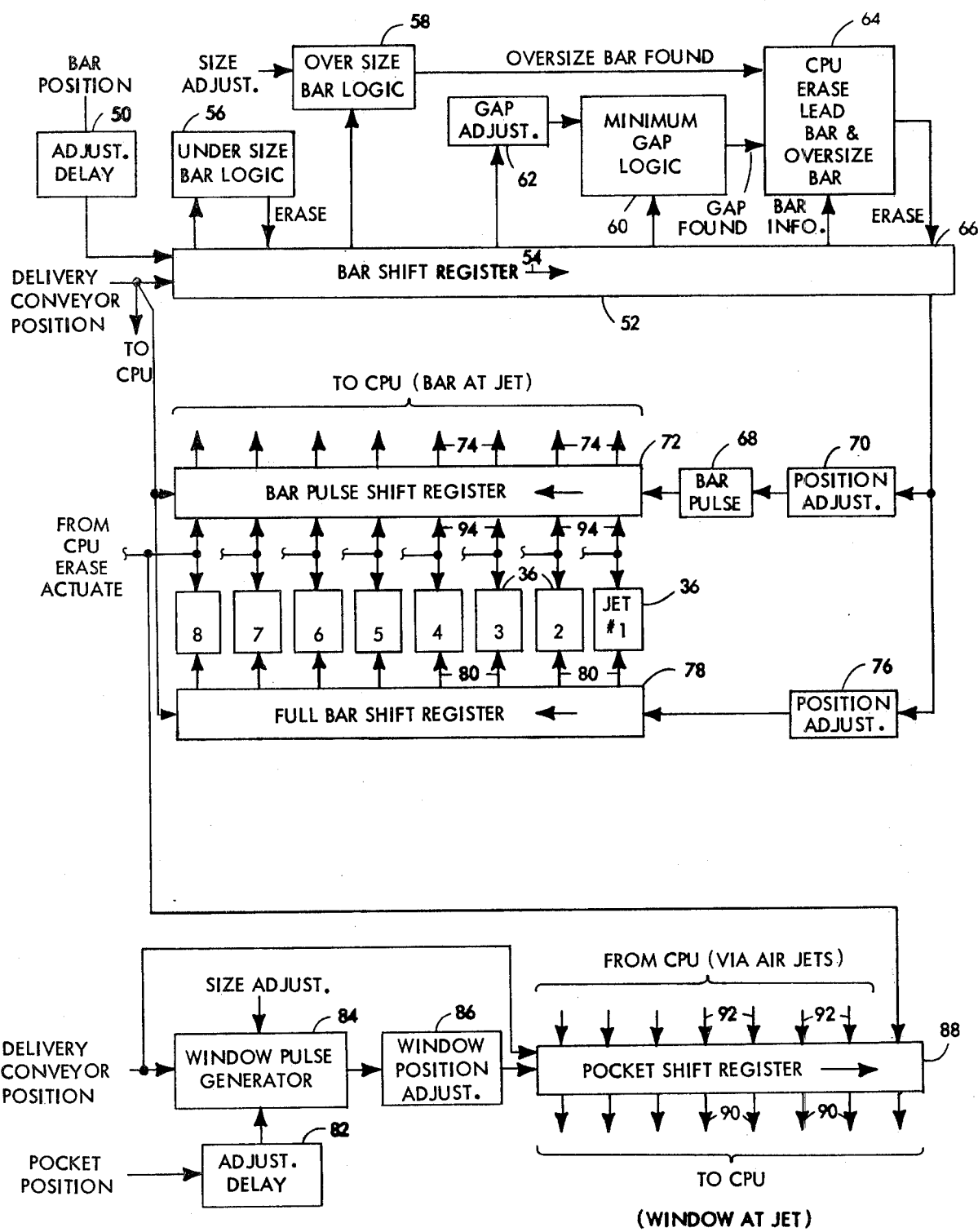
FIG. 5 is a block diagram of the transfer apparatus illustrating the operation of the system.

The block diagram of FIG. 5 illustrates the operation of the transfer apparatus. Bar position information is fed into an adjustable delay 50 which accounts for the positioning of sensors in the system. This delay information is fed into a bar shift register 52 which stores and shifts information relating to the bar in a manner corresponding to the movement of the bars on the delivery conveyor. Input to the bar shift register 52 relating to the delivery conveyor position controls the speed of shifting. The information can be considered to shift in the direction of the arrow 54.

A filter system screens out bars which are considered too large or too small so that they will not be transferred.

An undersize bar detection system 56 monitors the bar information in the bar shift register 52 and erases the information from the bar shift register 52 relating to undersize bars.

An adjustable oversize bar detection system 58 also monitors the information in the bar shift register 52 and generates an output when an oversize bar is found.

An undersize spacing detection system 60 having an input from a gap size adjustment 62 likewise monitors the bar shift register 52. It provides an output signal when the space between two objects is too small. This information may be important because the transfer device such as an air jet may not work properly if the bars are too closely spaced.

When an oversize bar is found or an undersize gap is found a logic system such as a central processing unit, CPU, 64 erases the information in the bar shift register 52 relating to the oversize bar or one of the bars which are too closely spaced.

Information arriving at the far end 66 of the bar shift register 52 will contain only information relating to bars which are suitable for transfer to the receiving conveyor.

A pulse representing the front of a bar is derived at 68 from the filtered, or processed, bar information. An adjustment 70 is provided. The pulse is placed in a bar pulse shift register 72. The shift register 72 has a plurality of outputs 74 having positions that correspond to the position of the air jets 36. A bar pulse then appears at an output when the leading edge of the corresponding bar is adjacent the corresponding air jet.

The filtered information from the bar shift register 52, after passing through an adjustment 76, enters a full bar shift register 78. This register also has outputs 80 which correspond to the location of the air jets 36.

A parallel information system processes information relating to the pockets in the receiving conveyor. Information on the position of a pocket, after being processed in an adjustable delay 82 is fed into a window pulse generator 84. The window pulse generator generates a pulse of an adjustable length which is movable by the window position adjust 86 to represent the desired range of placement of a bar in a pocket.

The window information is deposited in a pocket shift register 88 which shifts the information in a manner corresponding to the movement of the receiving conveyor. The pocket shift register 88 has a plurality of outputs 90 having positions that correspond to the position of the air jets.

The CPU is connected to and AND's the outputs of the pocket shift register 88 with the corresponding outputs of the bar pulse shift register 72. An AND condition will occur when an air jet, bar, and pocket are in a sufficiently aligned relationship for a transfer of the bar to be possible. The CPU then turns on the corresponding air jet to effectuate a transfer. The same signal that turns on the air jets is input at 92 and 94 on the pocket shift register 88 and bar pulse shift register 72 respectively to prevent the placement of another bar in a full pocket or the actuation of a second air jet where a bar was previously transferred. The outputs 80 to the full bar shift register turn the air jets off after a period of time corresponding to the length of the bar.

THE CONTROL SYSTEM
DETAILS

The control system shown in the block diagram of FIG. 5, is shown in more detail in FIGS. 1 through 4.

Figure 1:
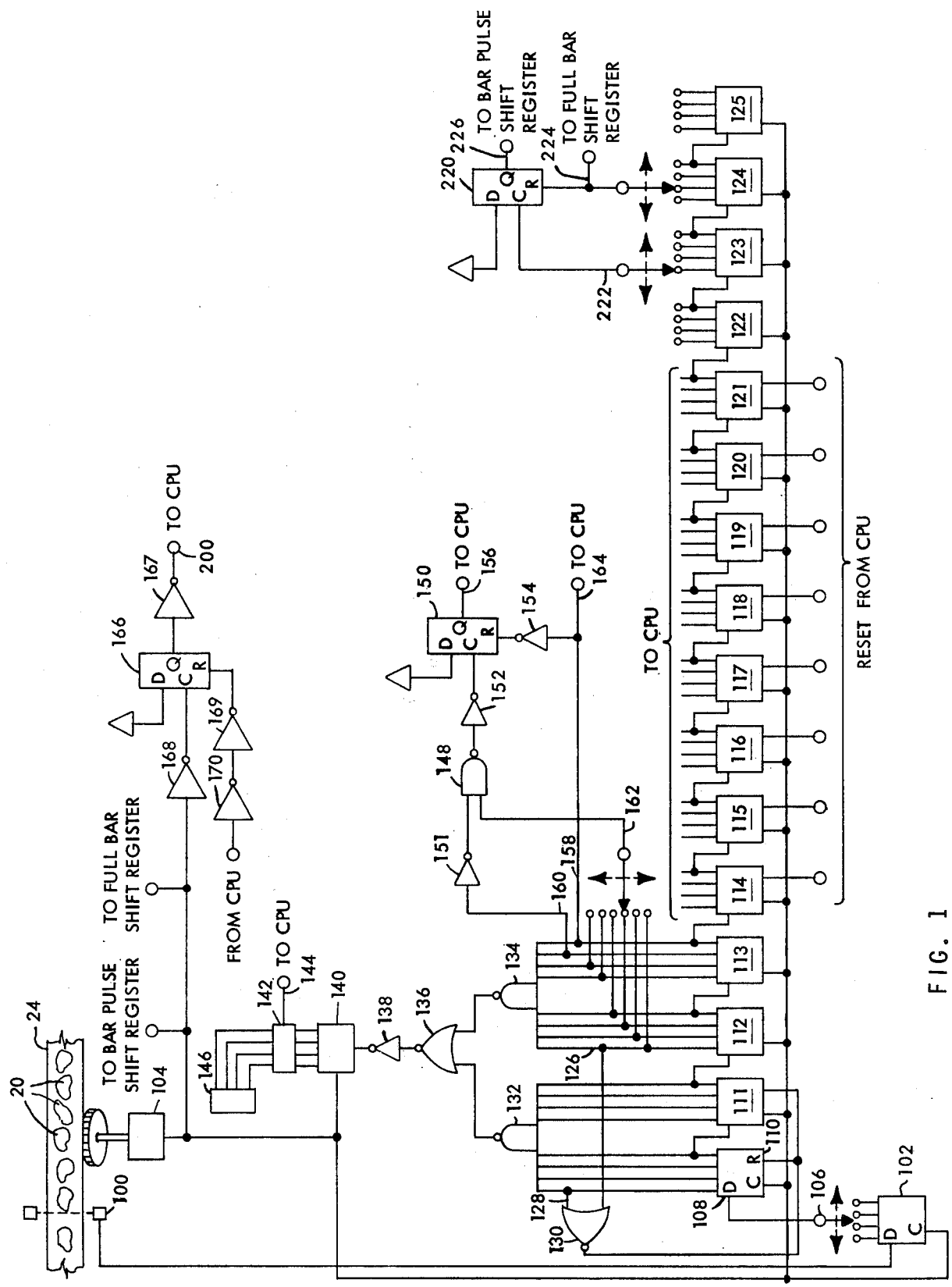
FIG. 1 is a schematic diagram of a portion of the transfer apparatus illustrating the delivery conveyor and the inputs to the hard wired portions of the system that determine the presence of undersize bars, oversize bars, and bars that are too closely spaced.
Figure 2:
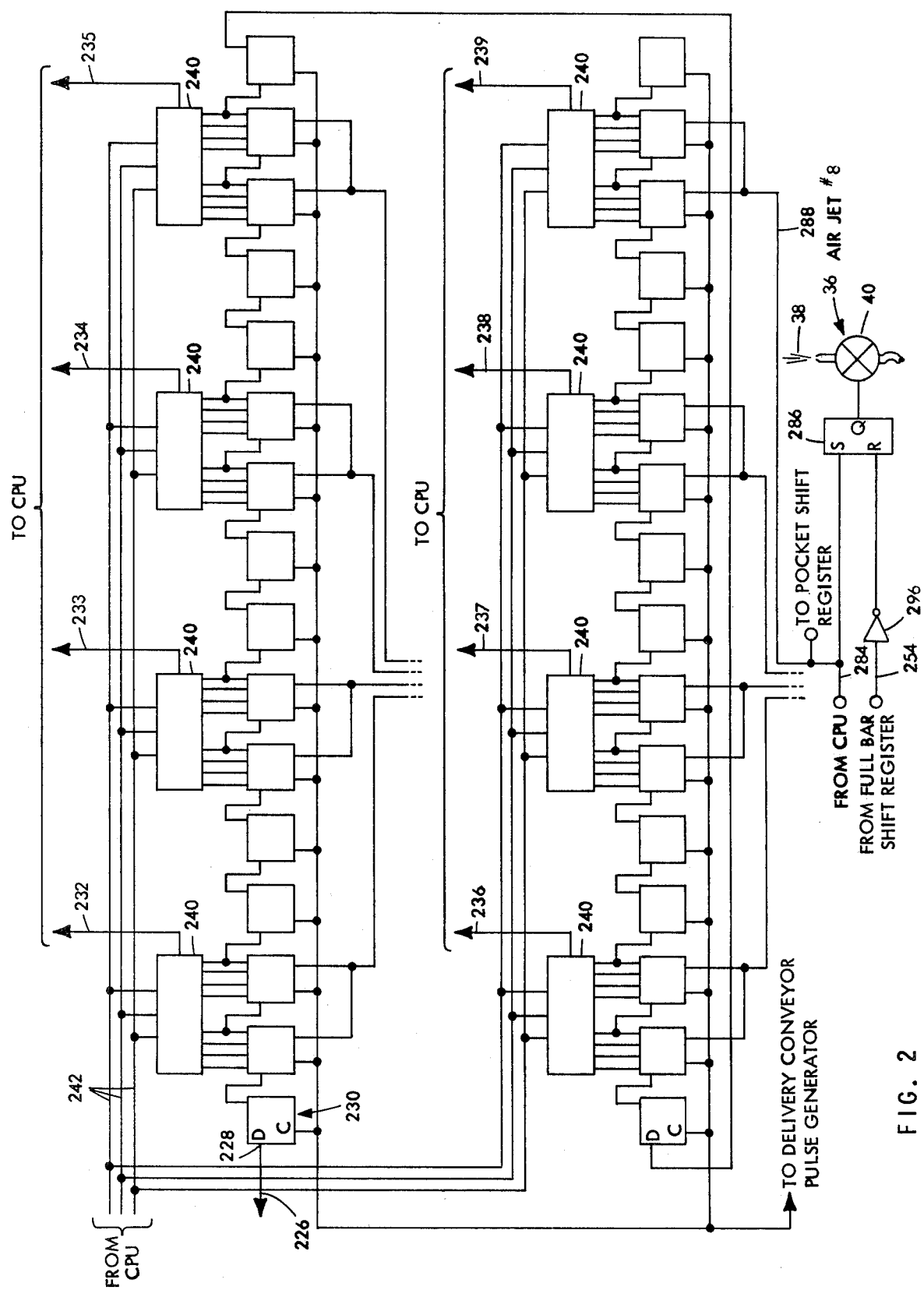
FIG. 2 is a schematic diagram of a portion of the transfer apparatus illustrating the bar pulse shift register and a representative connection to an air jet.
Figure 3:
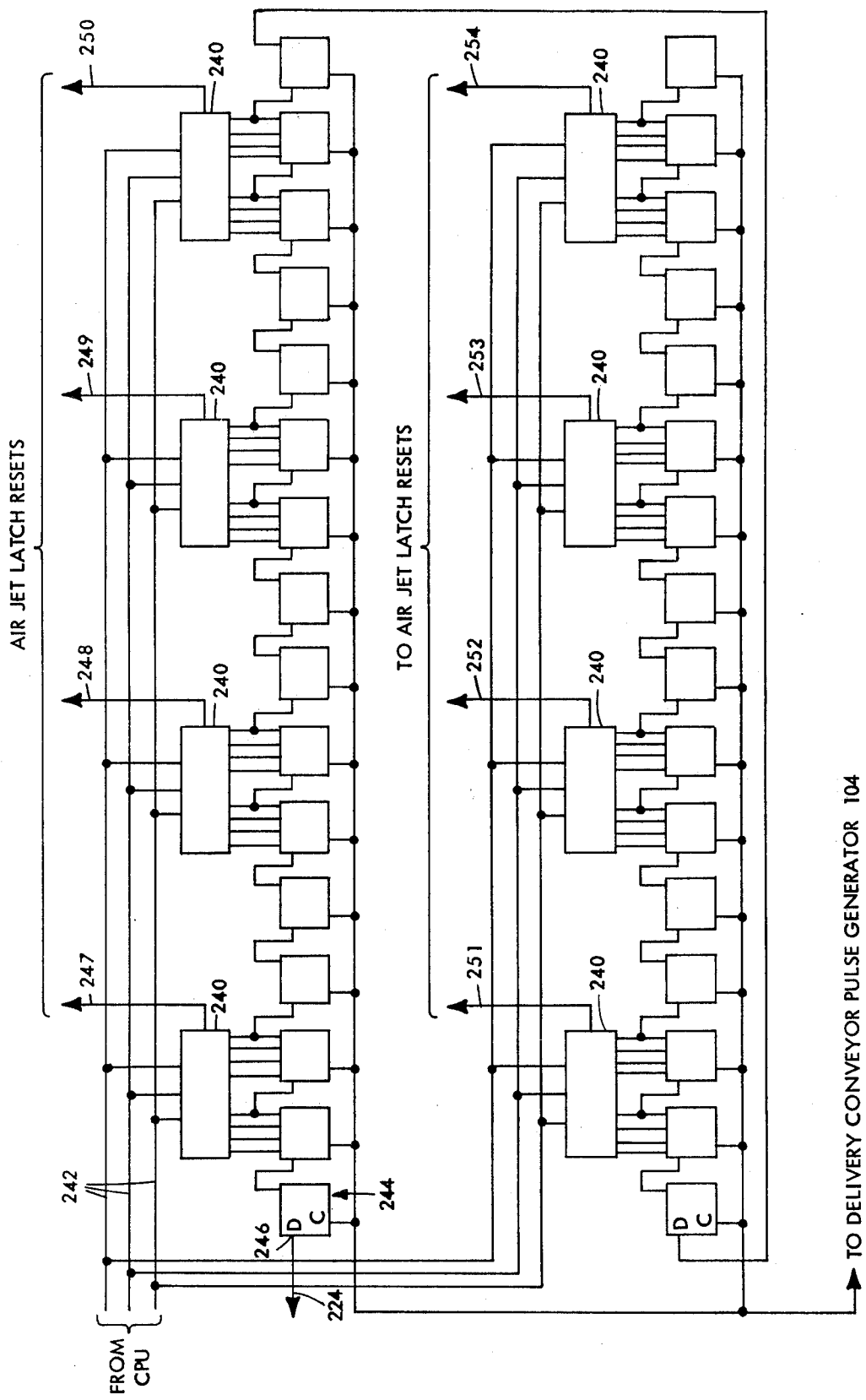
FIG. 3 is a schematic diagram of a portion of a transfer apparatus illustrating the full bar shift register.

FIG. 1 represents that portion of the system wherein information relating to bars is filtered to avoid the transfer of undersize or oversize bars and processed to detect and react to undersized gaps between bars.

The undersize and/or oversize bar detection circuits may be omitted from the apparatus as may the undersize gap detection system if desired.

The position of bars on the conveyor is detected by noting the passage of bars by a fixed point and noting the movement of the delivery conveyor. A detector, such as a photo detector 100, provides information on the passage of bars 20 along the delivery conveyor 24. The output of the photo detector 100 is adjustably delayed by connection of the data input of a multiple bit shift register 102. The shift register has its clock terminal connected to a detector, such as a pulse generator 104 connected to the delivery conveyor, which indicates movement of the delivery conveyor. The output of the shift register 102 is connected by an adjustable connection 106 to the data input of a multi-bit shift register 108 composed of a series of 4 bit shift registers, 110 through 125. Each shift register has its clock input tied to the pulse generator.

Information relating to undersize bars is erased by OR'ing two outputs of the shift register 108 such as, 126 and 128 as through the NOR gate 130. The output of the NOR gate is connected to the reset inputs of shift registers 110 and 111. Unless a bar is present and the bar is large enough to cause atleast one of the outputs 126 or 128 to be on while the information relating to that bar is passing through the shift registers 110 and 111 the resets to the shift registers are held in the reset mode. Thus if a bar is so small that it falls between the points represented by 128 and 126 the information relating to that bar is erased. No action will be taken on the undersized bar since it appears to be removed.

In order to determine if a bar is oversized a series of outputs, such as those to shift registers 110, 111, 112, and 113 are AND'ed. The outputs are connected through the parallel NAND gates 132 and 134 which are OR'd through the NOR gate 136 and inverter 138. The output of the inverter 138 is connected to the reset of a counter 140 connected to the delivery conveyor pulse generator. The counter is reset and held from counting until all the outputs of the shift registers 110-113 ae filled indicating a bar of a base size is present. The value of the counter then represents the dimension by which the bar exceeds the base size. If the pulse generator indicated every ⅛" movement of the delivery conveyor as in the example, then the base size would be 2" since there are 16 increments AND'ed. The output of the counter is connected to a comparator 142 which generates an output at 144 determined by the value selected on the four bit, binary switch 146. The comparator indicates when a bar over maximum desired size has been found. This is indicated by the counter achieving a value corresponding to the number of increments by which the maximum bar size exceeds the base size. The output of the comparator is fed to the CPU which responds in a manner described below to erase the information relating to the oversize bar. If desired the AND circuit could be omitted and the counter connected to a shift register output to see how many increments long a bar is from one end to the other.

In order to detect an undersize gap between two bars, the circuit using the NAND gate 148, the flip-flop 150, and the inverters 151, 152, and 154 provide a one increment pulse at output 156 when there is a high-low-high condition on connections 158, 160, 162, respectively. This indicates that the end of a leading bar is between 158 and 160 and the leading edge of thee following bar is close enough to reach the output contacted by variable connection 162, which determines the size of the minimum allowable gap. The output on 156 goes to the CPU which responds in a manner described below to erase information relating to the leading bar.

The output 164 connects to the CPU to allow the computer to detect the position of a bar.

The flip-flop 166 and its associated inverters and amplifiers 167–170 receive signals from the delivery conveyor pulse generator to cycle the CPU after receiving an acknowledgement of response to the previous signal to cycle.

Figure 7:
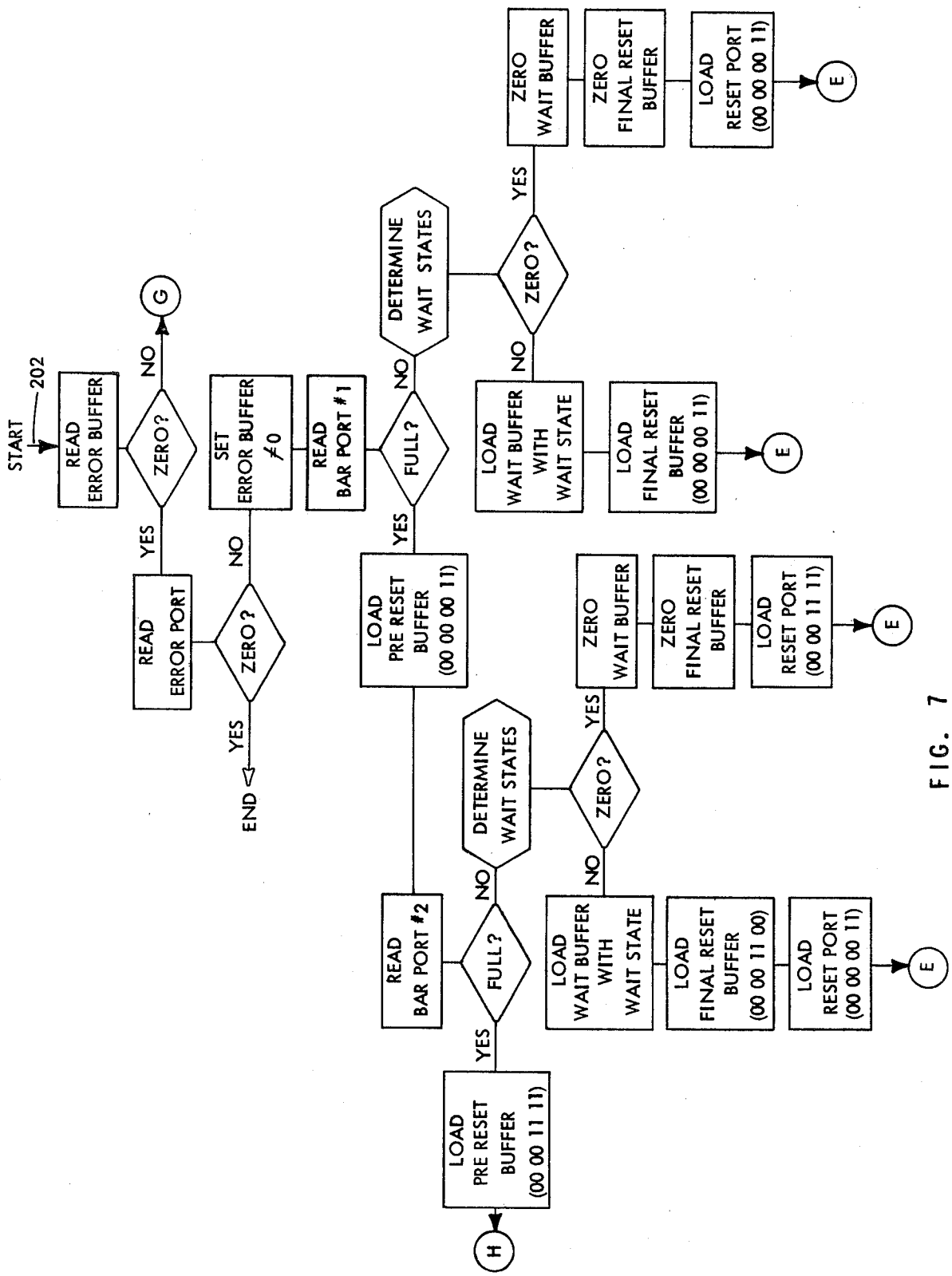
FIGS. 7, 8, and 9. together, form the logic flow chart for the Central Processor Unit operation, which erases information relating to oversize bars and a leading bar that is too close to a following bar, when the figures are joined at the connection points E, G and H.
Figure 8:
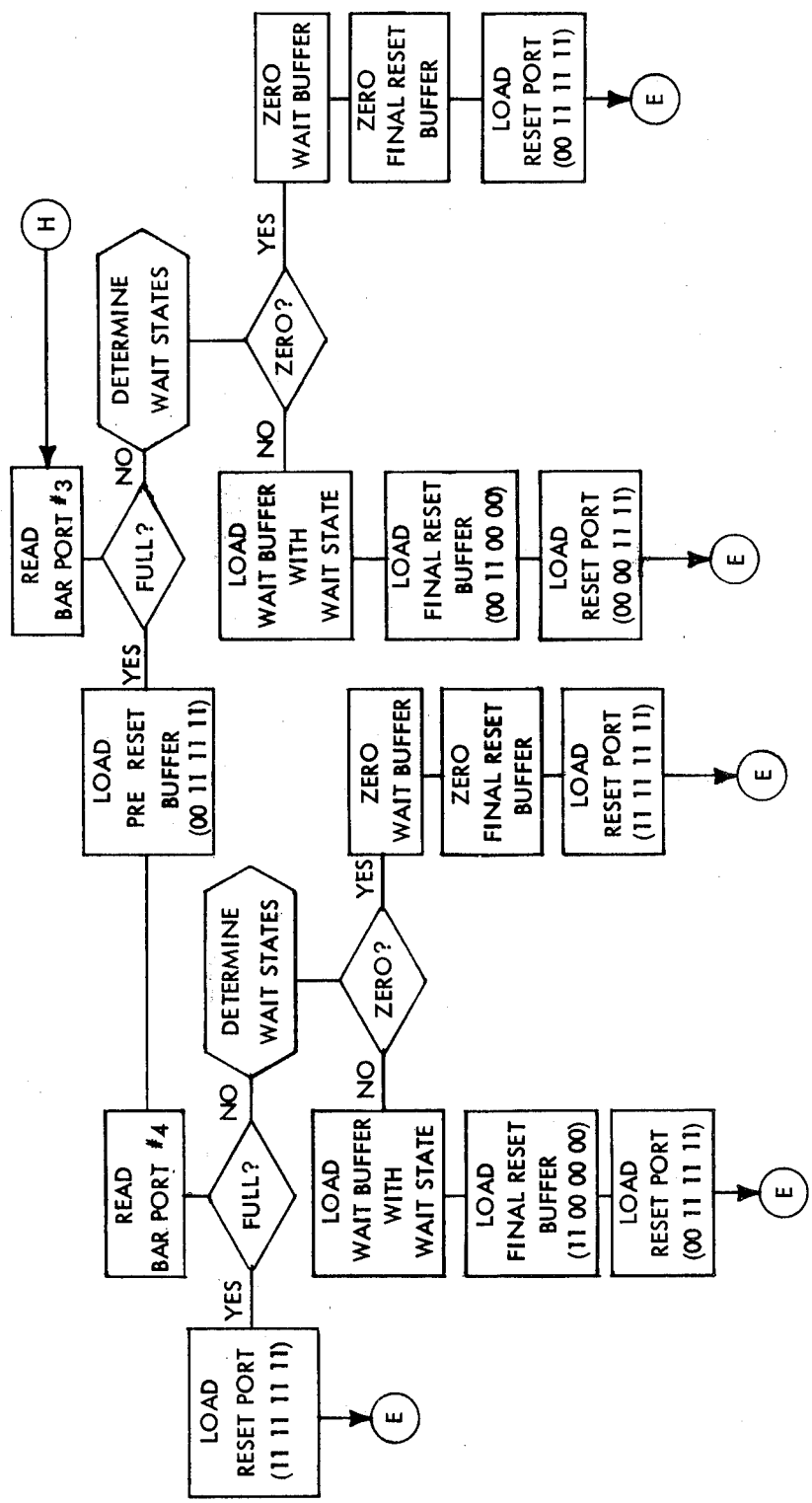
Figure 9:
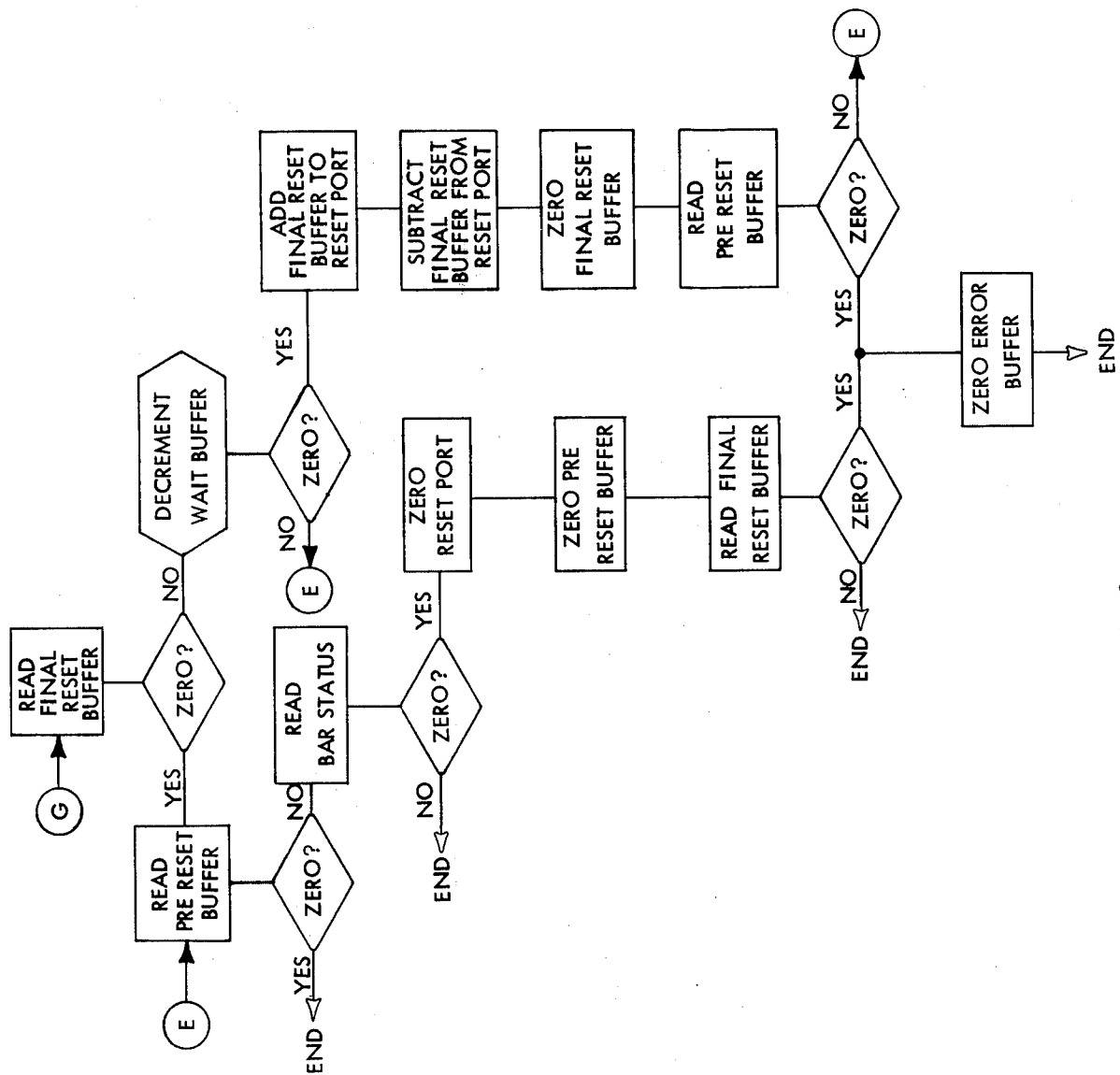

The operation of the CPU in erasing bar information is illustrated by the flow chart in FIGS. 7, 8 and 9. The preferred form of central processing unit is based on an INTEL 8080 microprocessor described in more detail in the manufacturer's publication *INTEL* 8080 *Microcomputer Systems User's Manual—September* 1975, #98-153c, 1976, published by Intel Corporation, 3065 Bowers Avenue, Santa Clara, California 95051 and programmed in accordance with the flow chart illustrated herein and in a manner more fully detailed in *Intel* 8080 *Assembly Language Programming Manual,* #98-004C Rev. C, 1976, published also by the manufacturer.

Upon receiving a signal from connection 200, shown on FIG. 1, indicating that the delivery conveyor has advanced the CPU starts through the erase logic system at 202. It first reads an error buffer which is initially at zero as are the other buffers in the system. If this is zero, as it will initially be, the error port is read. The error port holds a signal which is zero unless an oversize bar has been detected or an undersize gap has been detected and indicated on connections 144 and 156, respectively, in FIG. 1. If no error condition is present the routine is terminated until the system is incremented by another pulse from the delivery conveyor pulse generator 104 to start the routine again. If an error is found the error buffer is set to a non-zero condition and the first bar port is read. The first bar port is the eight outputs of shift registers 114 and 115. The second bar port is the eight outputs of shift registers 116 and 117, and so on; there being a total of four bar ports.

If the bar ports are completely full then a number indicating that the entire shift register pair 114 and 115 may be reset is placed in the pre-reset buffer. The next bar port is then read. If this is full a new number is placed in the pre-reset buffer and then bar port #3 is read. If full the pre-reset buffer is again given a new number and bar port #4 is read. If bar port #4 is also full the reset port is loaded with the binary number shown, a number which will cause the shift registers 114 through 121 to be reset. Then the pre-reset buffer is read, it will not be zero, and the bar status is read. The bar status is connected to connection 164 shown on FIG. 1. The bar status is not zero until the oversize bar or the leading bar which is too close has its trailing edge enter shift register 114. The non-zero condition causes the resets on the full shift registers to remain on, since the routine is terminated until the system is incremented again, to erase the trailing edge of a bar being erased. If the bar status is zero, as after sufficient incrementing occurs, the reset port is zeroed to remove the reset signals from the shift registers and the pre-reset buffer is zeroed. Then the final reset buffer, which deals with erasure of partially full registers and is described more fully below, is read, if this final reset buffer is not zero indicating that there was a partially full shift register the routine is terminated until incremented again. If it is zero, as it would be initially, the error buffer is zeroed and the routine is terminated until the system is incremented and another error is found.

The operation where there is a partially full register may be illustrated by the operation of the system where bar port #1 is full and bar port #2 is partially full. If a bar port is partially full then a wait state is determined, since resetting a partially full shift register pair, may erase wanted data relating to the rear end of a bar ahead of the bar intended to be erased. To avoid this the system is designed to wait until the rear of the other bar is out of the way before the register pair is reset. A wait state is a number that corresponds to the number of increments it will take to clear the "good" bar. This is done by counting the number of rotations right of the bar port reading until there is a zero in the least significant bit. For example, a reading of [11 11 00 00] indicates a zero wait state because there is no prior bar present and a reading of [11 00 00 11] indicates a wait state of two. If the wait state is zero the wait buffer is zeroed as is the final reset buffer and the reset port is loaded with the number [00 00 11 11] to cause shift registers 114, 115, 116 and 117 to be reset. If the wait state is not zero the wait buffer is loaded with the wait state, the final reset buffer is loaded with the number which will, when used later, cause the partially full register pair to be reset, and the reset port is loaded to erase the registers for the ports which are full. When the system is incremented where there is a nonzero wait state, since the error buffer and final reset buffer are not zero the wait buffer is decreased by one to see if the register pair can be reset. If not the CPU proceeds to see whether any shift register pairs previously reset should now have their reset signals removed. If the partially full register pair can be reset then the final reset buffer is added to the reset port then subtracted to reset the partially full register pair. The final reset buffer is zeroed to indicate that the partially full register pair has been reset. The pre-reset buffer is then read to see if any full register pairs are still held on and if not the error buffer is zeroed.

In the air jet transfer system the leading bar is erased because it may impact on an attempt to transfer it with the trailing bar. This is because the bar will lose some of its forward momentum when hit with the air blast. This causes the bars to exit at a less than ninety degree angle to the direction of conveyor travel and possibly strike following bars.

The information entering shift registers 122–125 shown in FIG. 1 relates only to bars which are to be transferred. The flip-flop 220 is connected by the adjustable connections 222 and 224 to outputs from these shift registers. The flip-flop provides an output at 226 in the form of a pulse representing the leading edge of the bar. This output is connected to the data input 228 of a multibit, bar pulse shift register 230 shown in FIG. 2. The clock terminals of the shift register components are connected to the delivery conveyor pulse generator.

Outputs 232-239 from the shift register correspond to the position of the air jets 1-8 respectively. Eight binary controlled switches 240 permit the adjustment of the output connections 232-239 to the shift register 230. The selection of the shift register output positions to be monitored is controlled by a binary input signal on control connections 242. The control connections are coded by manual switches in the CPU.

A second multibit shift register 244 has its data input 246 connected to connection 224 and its clock connected to the delivery conveyor pulse generator 104. This forms the full bar shift register which carries information on the bar sizes. The outputs 247-254 from the shift register correspond to the positions of the air jets 1-8, respectively. The binary controlled switches work as described above to permit adjustment of the output connections.

A third multibit shift register 256 forms a window shift register which contains information relating to the size and location of pockets 30 on the receiving conveyor 28 which are to be filled. The pocket detection system preferably consists of a sensor, such as the proximity switch 258, for detecting the passage of a pocket by sensing the passage of the pusher bars 32. Limit switches or other sensors may be used equally well. The pocket detection system also includes a conveyor movement detector such as the pulse generator 260 connected to the conveyor. The outputs from these sensors are fed into a shift register 262 which provides an adjustable signal delay like shift register 102, in FIG. 1. The output of the pulse generator 260 is also fed into an octal counter 263, such as an CMOS Ic 4022, after passing through a Schmitt trigger 264 and inverter 266 to provide sharp input signals. The reset of the counter is connected to the output of the shift register 262. The counter provides a pulse at its output 268 of a length which depends on the place to which the adjustable loop connection 270 is connected. A pulse is generated for each pocket 30 that passes. The output of the counter 263 is passed through shift registers 270-274 to permit further delay before it enters the data input of the window shift register 256. This results in a signal entering the shift register representing a target position in the pocket, or window. The window's position and size determines where the bar will be placed in a pocket 30.

The shift register 256 has outputs 275-282 which correspond to the position of the air jets 1-8 respectively.

The CPU monitors outputs 275-282 of the window shift register and outputs 232-239 of the bar pulse shift register. The computer AND's these to determine when a bar 20, air jet 36, and window are aligned. When the AND condition is found the CPU provides a signal on connection 284 to actuate the air jet latch 286 which turns on the valve 36 for air jet #8 shown in FIG. 2. There are corresponding latches and connections for the other air jets. The same signal is attached to reset connections 288 and 290 on the bar pulse shift register 230 and window shift register 256 respectively to erase the signals corresponding to the bar transferred and the pocket filled. Similar connections are provided which correspond to the other air jets. The NOR gates 292 and inverters 294 are provided to effectively erase all the window information from the window shift register 256. The outputs 247-254 from the full bar shift register are connected through an inverter 296 to the corresponding reset of the air jet latch, as shown for air jet #8 in FIG. 2; to turn off the air jet after the bar would have passed.

We claim:

1. A transfer apparatus for selectively transferring objects from a delivery conveyor to selected sections of a receiving conveyor of the type having a longitudinal portion thereof juxtaposed the delivery conveyor along a portion of the delivery conveyor intermediate to its ends comprising:
    (a) means for detecting the position of the objects on the delivery conveyor;
    (b) means for detecting the position of the selected sections of the receiving conveyor;
    (c) means for transferring objects from the intermediate portion of the delivery conveyor transversely with respect to the direction of travel of the delivery conveyor to the receiving conveyor sections; and
    (d) means, responsive to the object detection means and the receiving section detection means, for actuating the object transfer means to effect the transfer of an object from the delivery conveyor to a section of the receiving conveyor.

2. A transfer apparatus for selectively transferring objects from a delivery conveyor to selected seections of a receiving conveyor, as claimed in claim 1, wherein the transfer actuation means includes means for determining a positional proximity of an object to be transferred, the transfer means and a receiving section on the receiving conveyor to actuate the transfer means to effect a transfer.

3. A transfer apparatus for selectively transferring objects from a delivery conveyor to selected sections of a receiving conveyor, as claimed in claim 2 wherein the object position detection means comprises means for detecting the passage of an object on the delivery conveyor and means for detecting the movement of the delivery conveyor and wherein the transfer actuation means comprises a shift register having a clock input connected to the delivery conveyor movement detection means, a data input connected to object passage detection means so that the input signals which are introduced into the shift register are shifted in a manner corresponding to the changing position of objects on the delivery conveyor, a plurality of outputs, and an output connected to the positional proximity determination means, and a plurality of reset inputs so that information in the shift register relating to an object may be erased before it reaches the positional proximity determination means, and means for determining if there is an undersized spacing between two objects on the delivery conveyor and producing an input to a shift register reset for selectively erasing information in the shift register relating to one of the objects that is too closely spaced.

4. A transfer apparatus for selectively transferring objects from a delivery conveyor to selected sections of a receiving conveyor, as claimed in claim 2, wherein the object position detection means comprises means for detecting the passage of an object on the delivery conveyor and means for detecting the movement of the delivery conveyor.

5. A transfer apparatus for selectively transferring objects from a delivery conveyor to selected sections of a receiving conveyor, as claimed in claim 4, wherein the transfer actuation means includes an object shift register having a data input connected to the object passage detection means, a clock input connected to the delivery conveyor movement detection means so that the input signals which are introduced onto the shift register are shifted in a manner corresponding to the changing position of objects on the delivery conveyor, and an output which corresponds to the position of the transfer means.

6. A transfer apparatus for selectively transferring objects from a delivery conveyor to selected sections of a receiving conveyor, as claimed in claim 5, wherein the receiving section detection means comprises means for detecting the passage of the receiving sections and means for detecting the movement of the receiving conveyor and wherein the transfer actuation means further comprises a receiving section shift register having a data input connected to the receiving section detection means, a clock input connected to the receiving conveyor movement detection means so that the input signals which are introduced into the shift register are shifted in a manner corresponding to the changing position of the receiving sections, and an output which corresponds to the position of the transfer means.

7. A transfer apparatus for selectively transferring objects from a delivery conveyor to selected sections of a receiving conveyor, as claimed in claim 6 wherein the positional proximity determination means comprises a logic system having inputs connected to the object shift register output and to the receiving section shift register output producing an output in response to the appearance of signals at both inputs to actuate the transfer means and effect an object transfer.

8. A transfer apparatus for selectively transferring objects from a delivery conveyor to selected sections of a receiving conveyor, as claimed in claim 2, wherein the transfer actuation means includes an object filter so that objects which do not meet selected dimensional criteria will not be transferred.

9. A transfer apparatus for selectively transferring objects from a delivery conveyor to selected sections of a receiving conveyor, as claimed in claim 8, wherein the object position detection means comprises means for detecting the passage of an object on the delivery conveyor and means for detecting the movement of the delivery conveyor and wherein the object filter comprises a filter shift register having a clock input connected to the delivery conveyor movement detection means, a data input connected to the object position detection means so that the input signals which are introduced into the shift register are shifted in a manner corresponding to the changing position of objects on the delivery conveyor, a plurality of outputs, an output connected to the input of the positional proximity determination means, and a plurality of reset inputs so that signals in the shift register relating to a dimensionally unsuitable object may be erased before it reaches the positional proximity determination means.

10. A transfer apparatus for selectively transferring objects from a delivery conveyor to selected sections of a receiving conveyor, as claimed in claim 9, wherein the object filter further comprises means, connected between two outputs of the filter shift register and to the shift register reset, for determining if an object is undersized which produces an output to erase the signals corresponding to an undersized object from the shift register to prevent a transfer of the object from the delivery conveyor.

11. A transfer apparatus for selectively transferring objects from a delivery conveyor to selected sections of a receiving conveyor, as claimed in claim 9, wherein the object filter further comprises means, connected at its input to an output of the shift register, for determining if an object is oversized which produces an output to erase the signals corresponding to an oversized object from the shift register to prevent a transfer of the object from the delivery conveyor.

12. A transfer apparatus for selectively transferring objects from a delivery conveyor to selected sections of a receiving conveyor, as claimed in claim 11, wherein the oversize object determination means comprises a counter having its input connected to an output of the shift register, a comparator having its input connected to the counter which produces an output in response to the counter achieving a selected value and means, connected at its input to the comparator output and at its output to a shift register reset, for selectively erasing information in the shift register relating to the particular object that is oversized without erasing information on other objects.

13. A transfer apparatus for selectively transferring objects from a delivery conveyor to selected sections of a receiving conveyor, as claimed in claim 12, wherein the object filter further comprises means, connected between two outputs of the filter shift register and to the shift register reset, for determining if an object is undersized which produces an output to erase the signals corresponding to an undersized object from the shift register to prevent a transfer of the object from the delivery conveyor.

14. A transfer apparatus for selectively transferring objects from a delivery conveyor to selected sections of a receiving conveyor, as claimed in claim 13, wherein the transfer actuation means further comprises means, connected to the shift register inputs, for determining if there is an undersized spacing between two objects on the delivery conveyor and producing an input to a shift register reset for selectively erasing information in the shift register relating to one of the objects that is too closely spaced.

15. A transfer apparatus for selectively transferring objects from a delivery conveyor to selected sections of a receiving conveyor, as claimed in claim 2, wherein the transfer means comprises a plurality of transfer devices sequentially positioned along the delivery conveyor and wherein the transfer actuation means can selectively actuate the transfer devices.

16. A transfer apparatus for selectively transferring objects from a delivery conveyor to selected sections of a receiving conveyor, as claimed in claim 15 wherein the object detection means comprises means for detecting the passage of an object on the delivery conveyor and means for detecting the movement of the delivery conveyor and wherein the transfer actuation means comprises a shift register having a clock input connected to the delivery conveyor movement detection means, a data input connected to the object passage detection means so that the input signals which are introduced into the shift register are shifted in a manner corresponding to the changing position of objects on the delivery conveyor, a plurality of outputs connected to the positional proximity determination means which correspond to the positions of the transfer devices.

17. A transfer apparatus for selectively transferring objects from a delivery conveyor to selected sections of a receiving conveyor, as claimed in claim 16 wherein the shift register has a plurality of reset inputs connected to the positional proximity determination means and the positional proximity determination means provides a signal to the shift register to erase the information relating to an object which has been acted upon by a transfer device to transfer it so that downstream transfer devices will not try to transfer a previously transferred object.

18. A transfer apparatus for selectively transferring objects from a delivery conveyor to selected sections of a receiving conveyor, as claimed in claim 17 wherein the receiving section detection means comprises means for detecting passage of a receiving section and means for detecting the movement of the receiving conveyor and wherein the transfer actuation means comprises a receiving section shift register having a clock input connected to the receiving conveyor movement detection means, a data input connected to the receiving section passage detection means so that the input signals which are introduced into the shift register are shifted in a manner corresponding to the changing position of receiving sections on the receiving conveyor and a plurality of outputs connected to the positional proximity determination means which correspond to the position of the transfer devices.

19. A transfer apparatus for selectively transferring objects from a delivery conveyor to selected sections of a receiving conveyor, as claimed in claim 18 wherein the receiving section shift register has a plurality of reset inputs connected to the positional proximity determination means and the positional proximity determination means provides a signal to the receiving section to erase the information relating to a receiving section which has been filled by a transfer so that downstream transfer devices will not try to transfer an object into the previously filled pocket.

20. A transfer apparatus for selectively transferring objects from a delivery conveyor to selected sections of a receiving conveyor, as claimed in claim 19, wherein the transfer devices comprise air jets each having a control valve.

* * * * *